US009654552B2

(12) United States Patent
Rayanki et al.

(10) Patent No.: US 9,654,552 B2
(45) Date of Patent: May 16, 2017

(54) METHODS AND SYSTEMS FOR DELEGATING GROUP OWNERSHIP FOR THE FORMATION OF A NEW GROUP

(71) Applicant: MOTOROLA MOBILITY LLC, Chicago, IL (US)

(72) Inventors: Sreenivasulu Rayanki, Cupertino, CA (US); Naveen Aerrabotu, Cupertino, CA (US); Shyam Narayan, Santa Clara, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 296 days.

(21) Appl. No.: 14/465,172

(22) Filed: Aug. 21, 2014

(65) Prior Publication Data

US 2016/0057215 A1    Feb. 25, 2016

(51) Int. Cl.
*H04L 29/08* (2006.01)
*H04L 12/26* (2006.01)
(Continued)

(52) U.S. Cl.
CPC ........ *H04L 67/1051* (2013.01); *H04L 43/065* (2013.01); *H04L 67/1044* (2013.01); *H04L 67/1048* (2013.01); *H04L 67/18* (2013.01); *H04W 8/186* (2013.01); *H04W 84/12* (2013.01); *H04W 84/20* (2013.01)

(58) Field of Classification Search
CPC ... H04L 29/06; H04L 63/0823; H04L 63/083; H04L 65/403; H04L 67/1008; H04L 67/1048; H04L 67/1051; H04L 67/1044; H04W 12/06; H04W 84/20; H04W 8/186; H04W 84/12
See application file for complete search history.

(56) References Cited

U.S. PATENT DOCUMENTS

2001/0032335 A1*  10/2001  Jones ................. H04L 29/06
                                                    725/105
2006/0090067 A1*  4/2006  Edmonds .............. H04L 63/083
                                                    713/159
(Continued)

FOREIGN PATENT DOCUMENTS

EP         2677780 A1    12/2013

OTHER PUBLICATIONS

Hermann, et al., "Investigation of IEEE 802.11k-based Access Point Coverage Area and Neighbor Discovery," 32nd IEEE Conference on Local Computer Networks, Oct. 15-18, 2007, 6 pp.

(Continued)

*Primary Examiner* — Le H Luu
(74) *Attorney, Agent, or Firm* — Shumaker & Sieffert, P.A.

(57) ABSTRACT

Disclosed are methods and systems for devices in peer-to-peer networks to form a new group using information sent by a group owner in a previous group session. In some embodiments, a method of delegating group ownership from a first device to a second device for the formation of a new group includes: determining the second device will be the group owner of the new group during a current group session; broadcasting to devices in the current group session that the second device will be the group owner of the new group; dissolving the current group session; and forming a new group with the second device as group owner.

16 Claims, 6 Drawing Sheets

(51) Int. Cl.
*H04W 8/18* (2009.01)
*H04W 84/12* (2009.01)
*H04W 84/20* (2009.01)

(56) References Cited

U.S. PATENT DOCUMENTS

| | | | |
|---|---|---|---|
| 2007/0236727 A1 | 10/2007 | Proust et al. | |
| 2008/0013537 A1* | 1/2008 | Dewey | H04L 63/0823 370/390 |
| 2012/0173620 A1* | 7/2012 | Holostov | H04L 67/1048 709/204 |
| 2012/0278389 A1* | 11/2012 | Thangadorai | H04W 84/20 709/204 |
| 2012/0297229 A1 | 11/2012 | Desai et al. | |
| 2013/0339504 A1* | 12/2013 | Montemurro | H04W 12/06 709/223 |
| 2014/0075011 A1 | 3/2014 | Salkintzis | |
| 2014/0136318 A1 | 5/2014 | Alberth, Jr. et al. | |
| 2014/0344326 A1* | 11/2014 | Kamath | H04L 67/1008 709/203 |
| 2015/0149457 A1* | 5/2015 | Poko | H04L 65/403 707/736 |

OTHER PUBLICATIONS

Wi-Fi Alliance Technical Committee 4 P2P Task Group, "Wi-Fi Peer-to-Peer (P2P) Technical Specification," Version 1.2, 2010, 159 pp.

* cited by examiner

METHODS AND SYSTEMS FOR DELEGATING GROUP OWNERSHIP FOR THE FORMATION OF A NEW GROUP

TECHNICAL FIELD

The present disclosure is related generally to peer-to-peer networks and, more particularly, to the delegation of group ownership in peer-to-peer networks.

BACKGROUND

Many computers today have radios to support wireless communication. Wireless communication is used, for example, to connect to an access point of a network. By associating with the access point, a wireless computer can access devices on the network or on other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called Wi-Fi. This standard was promulgated by the Wi-Fi Alliance, and is widely used in portable computers. There are multiple versions of this standard, but any of them can be used to support connections through access points.

Wireless communications may also be used to form connections directly to other devices without using an access point. These connections are sometimes called "peer-to-peer" or P2P connections and may be used, for example, to allow a computer to connect to a mouse or keyboard wirelessly. Such peer-to-peer communication is typically performed between two client devices (e.g., computers, smart phones, printers, projectors, etc.) so that the devices can connect to form a network.

In the peer-to-peer group, a group owner is selected by a negotiation process (e.g., as described in Wi-Fi Peer-to-Peer specification). Once the peer-to-peer group is formed, new peer-to-peer peers or devices are able to identify the peer-to-peer group or peer-to-peer devices through a peer-to-peer device discovery mechanism (e.g., according to the Wi-Fi Peer-to-Peer specification).

In current peer-to-peer networks, if a group owner wishes to leave a group or to terminate the group session, there is no mechanism for maintaining the group and delegating the group ownership to another device in the group. Further, the Wi-Fi Peer-to-Peer specification does not provide any mechanism for delegate the group ownership in a Wi-Fi peer-to-peer network.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
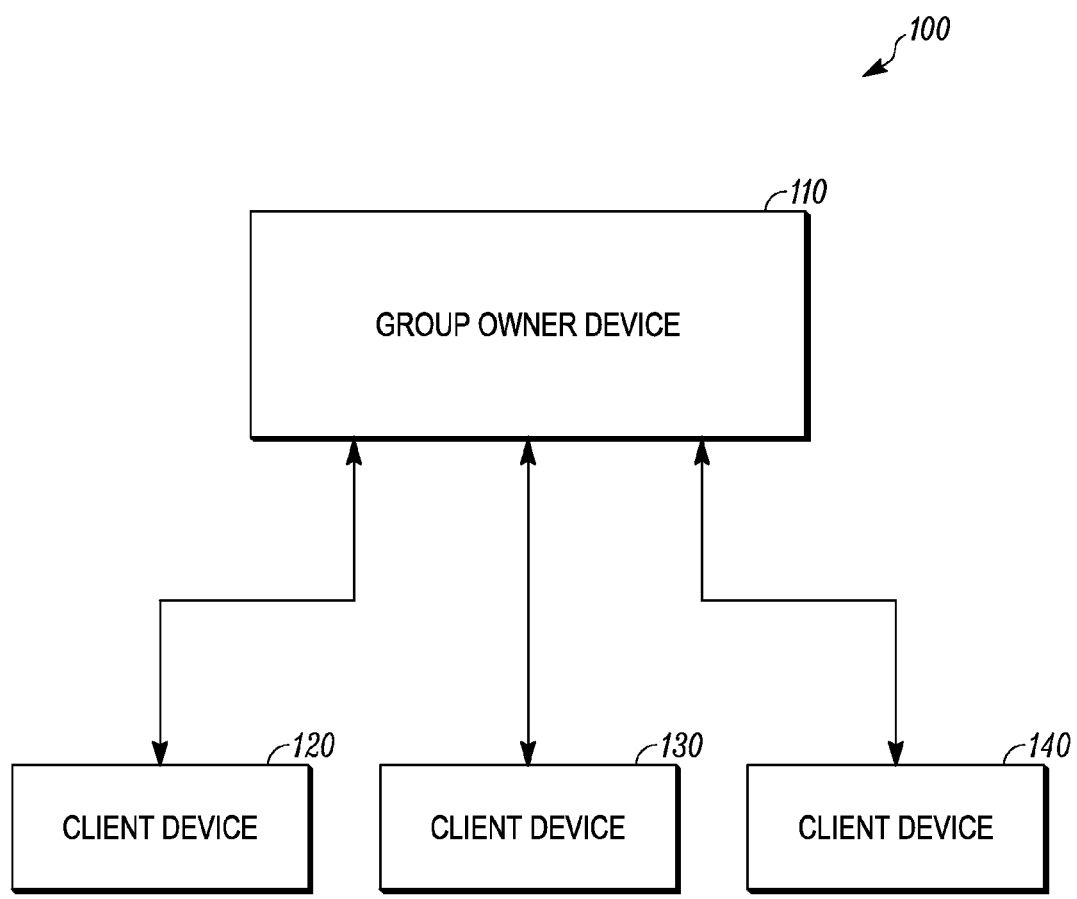
FIG. 1 is a block diagram illustrating a Wi-Fi peer-to-peer communication network in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

As provided above, in current peer-to-peer networks, there is no mechanism for maintaining a group and delegating ownership if a group owner decides to leave or terminate a group session. Furthermore, should a group owner run out of power or move to a roaming area, the group would be forced to terminate. In such instances, there is currently not a solution to reform a group without going through a lengthy authentication process. The present disclosure provides a solution for such devices in peer-to-peer networks to form a group using information sent by a group owner in a previous group session.

Apparatus for implementing any of the below described arrangements, and performing any of the below described method steps, may be provided by configuring or adapting any suitable apparatus, for example one or more computers or other processing apparatus or processors, and/or providing additional modules. The apparatus may include a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the below described process flowcharts may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the Figures, FIG. 1 is a block diagram illustrating a Wi-Fi peer-to-peer communication network or system 100 in which the present techniques may be practiced. This example system 100 includes a plurality of client or peer devices 110, 120, 130, 140. As shown, client device 110 is serving the role of group owner, and is therefore labeled as the group owner device. In other embodiments, the present disclosure may be implemented in a different system that may comprise a different number of user devices. Also, the present disclosure may be implemented in a different system that may include one or more appropriate different types of devices instead of or in addition to any or all of those devices in the system 100 shown in FIG. 1.

In FIG. 1, system 100 represents an unmanaged network in which the peer-to-peer client devices communicate with each other directly without requiring a centralized control point. This direct communication enables increased functionality in the network. As shown, group owner 110 communicates with the client devices 120, 130, 140 without requiring access points.

The terminology "client device" or "peer device" is used herein to refer to a personal or mobile computing device. Thus, each of the client devices 120, 130, 140 may be, for example, a smartphone, a wireless phone, a desktop personal user device, a laptop user device, a tablet user device, a mobile station, an entertainment appliance, a netbook, camera, a television, a game console, a wearable device, etc.

Additionally, while shown as a separate device type, group owner 110 may similarly refer to a personal or mobile computing device. That is, group owner 110 may be configured as a client device with the assigned role of group owner.

Group owner 110 and client devices 120, 130, 140 are configured to communicate via wireless protocols such as Wi-Fi, WiMax or any other wireless standard. In some embodiments, group owner 110 and client devices 120, 130, 140 may communicate amongst each other in ad-hoc or infrastructure based networks.

Figure 2:
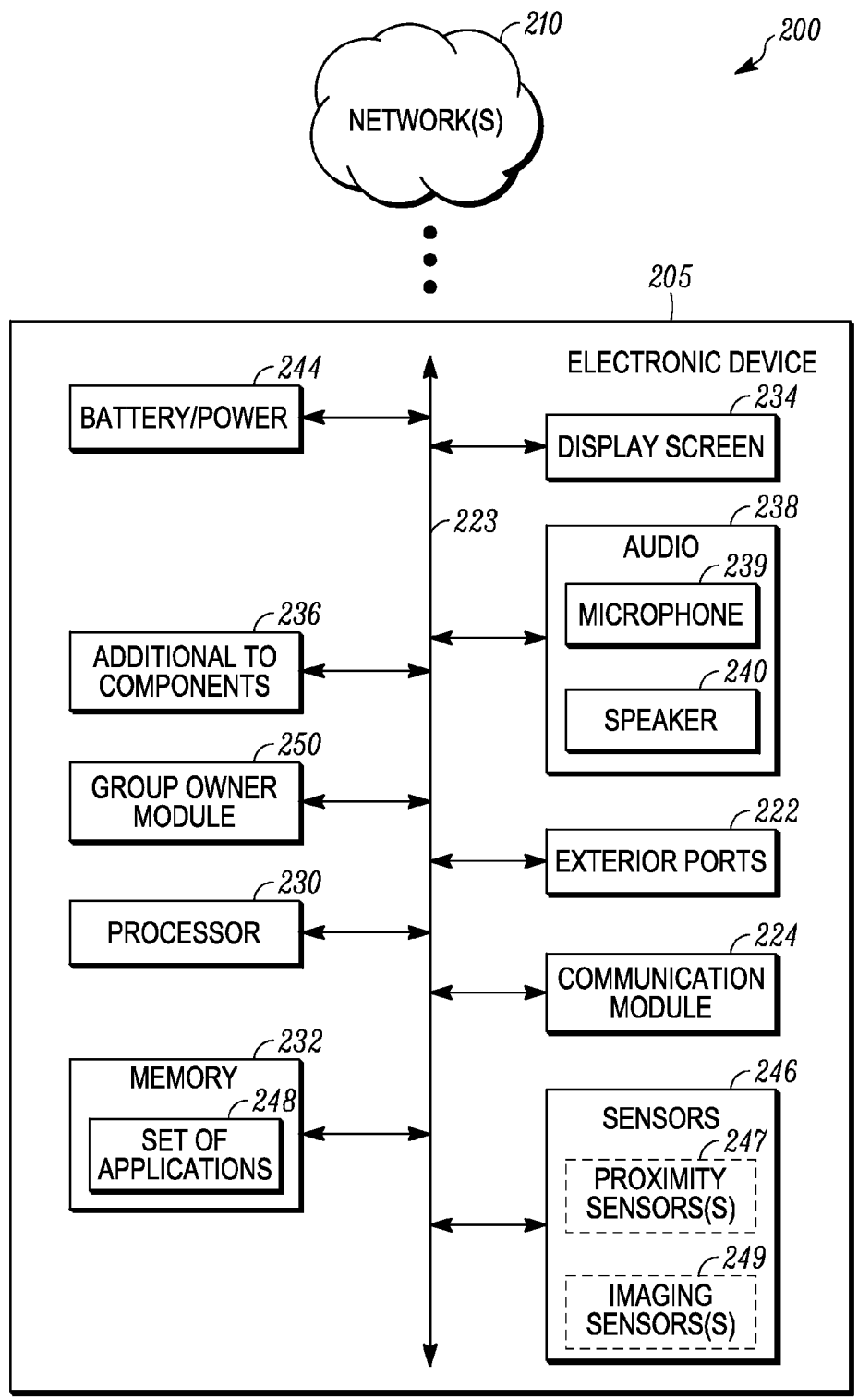
FIG. 2 is a block diagram of an example computer system in which the present techniques may be practiced.

FIG. 2 illustrates an example electronic device 205 (such as group owner 110 or client device 120, 130, 140) as discussed with respect to FIG. 1, in which the aspects may be implemented. The electronic device 205 can include a processor 230, a memory 232 (e.g., hard drives, flash memory, MicroSD cards, and others), a power module 244 (e.g., batteries, wired or wireless charging circuits, etc.), and one or more external ports 222 (e.g., cellular input and output, Universal Serial Bus (USB), HDMI, IEEE 1394, and/or others), each configured to communicate via a communication bus 223. The processor 230 can interface with the memory 232 to execute a set of applications 248 capable of facilitating the functionalities as discussed herein. As shown in FIG. 2, a group owner module 250 is provided that functions to interact with other devices and request and process device information for the purpose of determining which device is best suited to be a group owner. Group owner module 250 can interface with processor 230 and memory 232 as needed.

In some embodiments, the group owner module 250 collects device information and capabilities for client or peer devices in its network and/or attempting to join its network. In some embodiments, the group owner module 250 includes one or more algorithms or instructions for determining which client device is best equipped to operate as a successor group owner. Such algorithms include algorithms that select devices having the lowest discharge level, or highest battery level, algorithms that compare Wi-Fi and CPU/RAM capabilities, and combinations thereof. Alternatively, a simple metric, such as lowest media access control (MAC) address or physical address may be used to determine group ownership delegation. Additional metrics that may be used include battery capacity, discharge level, CPU/RAM, and Wi-Fi capabilities.

The electronic device 205 can further include a communication module 224 configured to interface with the one or more external ports 222 to communicate data via one or more networks 210. For example, the communication module 224 can include one or more transceivers functioning in accordance with IEEE standards, 3GPP standards, or other standards, and configured to receive and transmit data via the one or more external ports 222. More particularly, the communication module 224 can include one or more WWAN transceivers configured to communicate with a wide area network including one or more cell sites or base stations to communicatively connect the electronic device 205 to additional devices or components. Further, the communication module 224 can include one or more WLAN and/or WPAN transceivers configured to connect the electronic device 205 to local area networks and/or personal area networks, such as a Bluetooth network.

The electronic device 205 can further include one or more sensors 246 such as, for example, proximity sensors 247 (e.g., NFC sensors or RFID chips), imaging sensors 249, and/or other sensors. The electronic device 205 can include an audio module 238 including hardware components such as a speaker 240 for outputting audio and a microphone 239 for receiving audio. Audio module 238 may be configured to transmit and/or receive high frequency or ultrahigh frequency communications. As used herein, high frequency communications include 16,850 to 22,000 Hz. In some embodiments, a speaker (such as speaker 240) at the group owner device plays the audio and a microphone (such as microphone 239) at the client device receives the audio.

The electronic device 205 may further include one or more display screen 234, and additional I/O components 236 (e.g., touch sensitive input, keys, buttons, lights, LEDs, cursor control devices, haptic devices, and others). The display screen 234 and the additional I/O components 236 may be considered to form portions of a user interface (e.g., portions of the electronic device 205 associated with presenting information to the user and/or receiving inputs from the user).

In embodiments, the display screen 234 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others. Further, the display screen 234 can include a thin, transparent touch sensor component superimposed upon a display section that is viewable by a user. For example, such displays include capacitive displays, resistive displays, surface acoustic wave (SAW) displays, optical imaging displays, and the like.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 230 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 3:
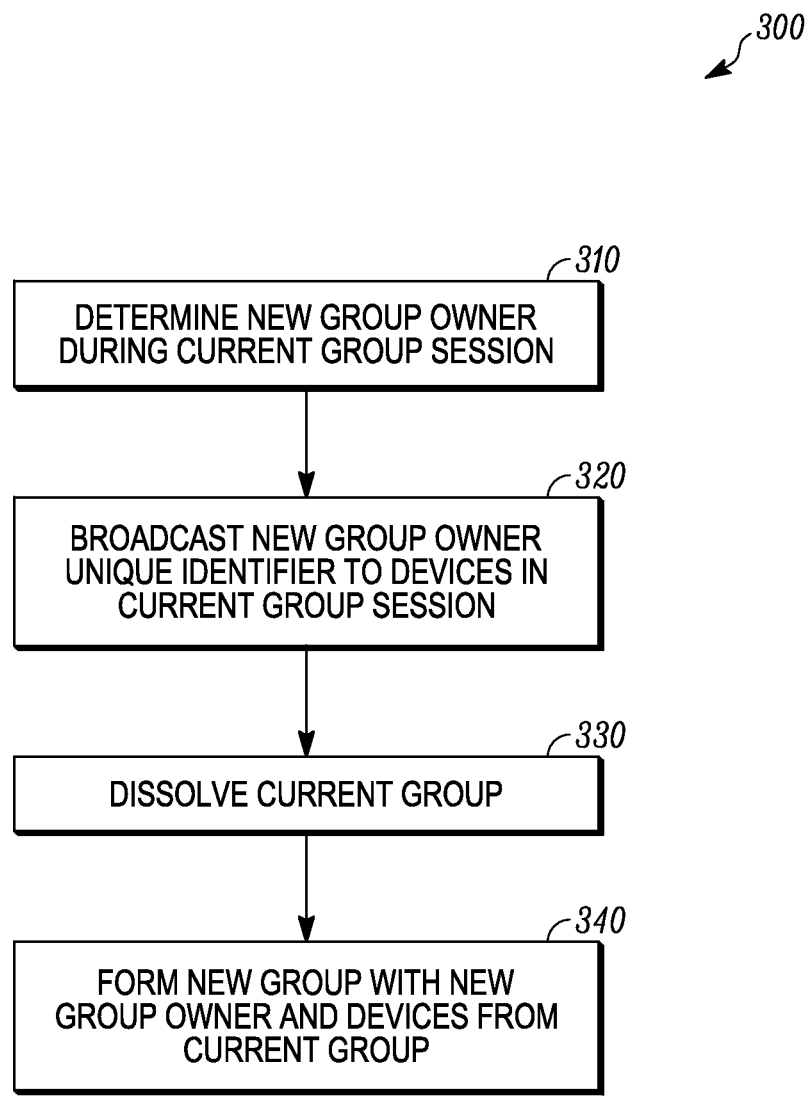
FIG. 3 is a flowchart of a representative method for delegating group ownership for the formation of a new group.

FIG. 3 is a flowchart of a representative method 300 for delegating group ownership for the formation of a new group. Method 300 begins with block 310 determining a new group owner during a current group session. In some embodiments, the current group owner determines the successor or new group owner for the new group during a current group session. This new group owner decision is performed according to an algorithm or metric, described in further detail in the discussion of FIG. 4.

In block 320, a unique identifier (UI) for the new group owner is broadcast to all client devices in the current group session. The unique identifier may include media access control (MAC) address, serial number, international mobile equipment identity (IMEI), among others. In some embodiments, the group owner of the current group session broadcasts the UI to all client devices in the current group session. This allows all the devices in a current group to know their role, whether group owner or client device, for the successor or new group session without having to negotiate roles upon group formation.

In some embodiments, the current group owner broadcasts information for all of the client devices in the current group. This information may include unique identifiers for all devices in the group. Consequently, each device in the group may have a unique identifier list for all other devices in the group.

In block 330, the current group session is terminated, causing the group to dissolve. Generally, the current group session is terminated when the current group owner exits or leaves the current group. In some embodiments, the group owner exits the current group due to a condition such as: low or dead battery, out of range, hardware failure, a device with better capabilities is detected, or the group owner simply desires to exit.

In block 340, the new group is formed with the new group owner and client devices from the current group session. This process of new group formation is described in more detail in reference to FIG. 5.

Figure 4:
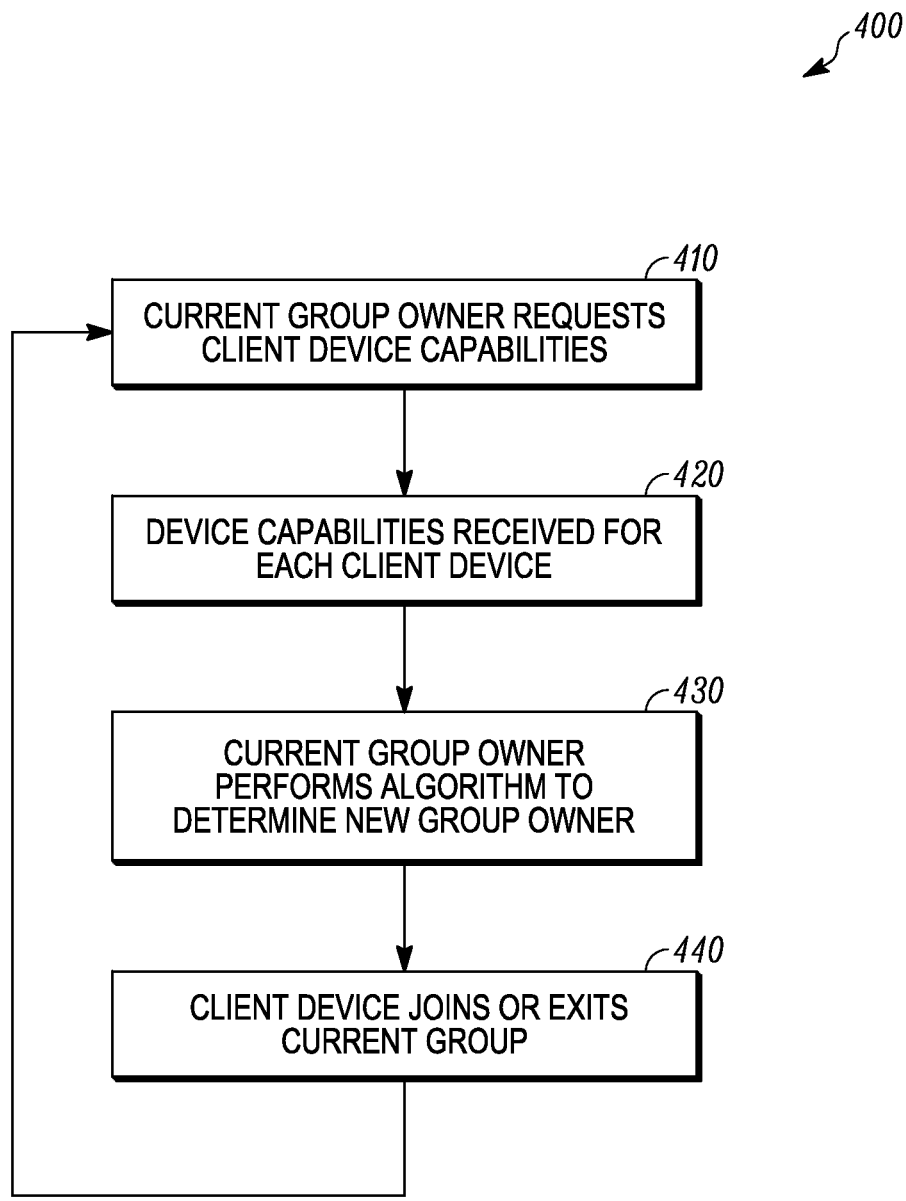
FIG. 4 is a flowchart of a representative method for determining how to delegate group ownership among client devices.

FIG. 4 is a flowchart of a representative method 400 for determining how to delegate group ownership among client devices. In block 410, the current group owner requests the client device capabilities for each of the client devices in the network. For example, the current group owner may request a unique identifier (UI), battery capacity and discharge level, CPU/RAM capacity, and Wi-Fi capabilities.

In block 420, the group owner receives the requested client device information. In some embodiments, client device information is received in JavaScript Object Notation (JSON) format.

In block 430, the current group owner performs an algorithm to determine a new group owner. The algorithm may be selected from the group including: selecting the device with the lowest media access control (MAC) address or highest MAC address. Alternatively, one or more metrics may be used to determine the new group owner. Such metrics include for example, battery capacity and discharge level, CPU/RAM capacity, and Wi-Fi capabilities. In some embodiments, the current group owner selects the top three client devices which have at less than a 50% discharge level. Thereafter, the group owner compares the Wi-Fi and CPU/RAM capabilities and selects the client device with the best Wi-Fi and CPU/RAM capabilities and lowest discharge level.

As shown, block 440 is optional. In some embodiments, whenever a client device (other than the group owner) joins or leaves the current group, the current group owner may run the algorithm or metric to determine the new group owner. In some embodiments, the current group owner runs the algorithm or metric at predetermined time intervals (e.g., every 2 hours, every 4 hours, etc.) or intermittently to ensure that if a more capable client device is detected or determined, that the more capable device is assigned the role of new group owner for the successive new group formation.

Figure 5:
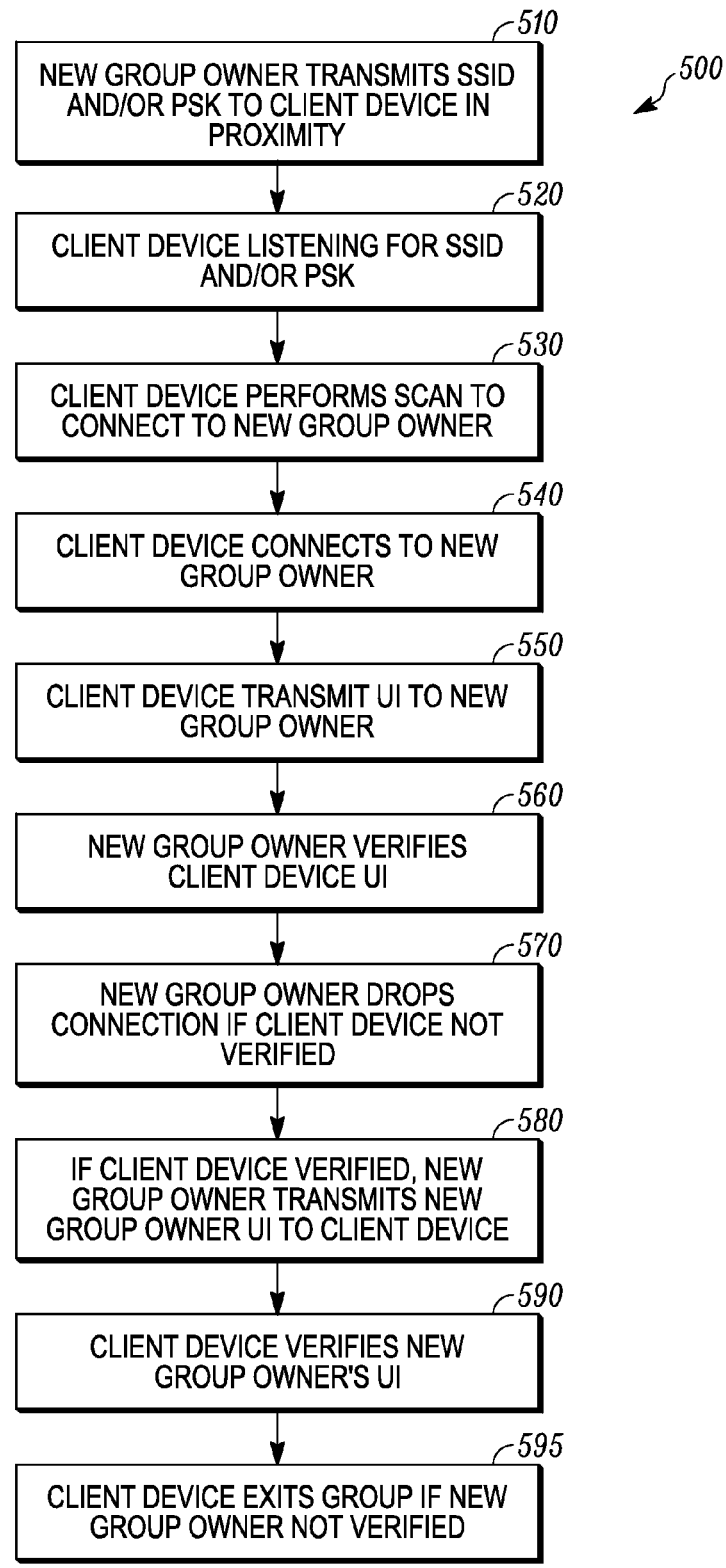
FIG. 5 is a flowchart of a representative method for forming a new group when the previous group is dissolved.

FIG. 5 is a flowchart of a representative method 500 for forming a new group when the previous group is dissolved. Upon, the pervious group dissolving, in block 510, the new group owner transmits a service set identifier (SSID) and/or pre shared key (PSK) (e.g., password), to client devices in its proximity. The SSID and/or PSK may also be referred to as "Wi-Fi credentials". This proximity will depend on the speaker capabilities of the group owner device. For example, if the group owner device is a mobile phone, the proximity may be in the range of about 20 feet or less. However, if the group owner device is a laptop, the proximity may be in the range of 100 feet or less.

The new group owner may transmit the SSID/PSK using audio tools such as high frequency or ultrahigh frequency, e.g. in a range of approximately 16,800-22,000 Hz. Such transmission is effected, using for example, a speaker or microphone in communication with audio module 238.

The new group owner may transmit the SSID/PSK for a predetermined period of time (e.g., 20 seconds, 1 minute, 5 minutes, etc.). In some embodiments, the new group owner transmits the SSID/PSK until he receives confirmation that a client device has received the SSID/PSK. In some embodiments, the new group owner transmits the SSID/PSK at fixed intervals, such as every 10 seconds. In some embodiments, the new group owner transmits the SSID/PSK intermittently.

In block 520, the client devices stand by in listening mode for communication from the new group owner. The client devices may similarly have learned that the current group has dissolved by trying to communicate in the current group and received no response. Upon learning that the current group session has dissolved, the client devices are configured to assume the listening mode.

In some embodiments, client devices remain in listening mode for a predetermined period of time (e.g., 20 seconds, 1 minute, 5 minutes, etc.). While in listening mode, client devices may be waiting for one or more high frequency or ultrahigh frequency inquires (e.g. SSID/PSK).

In block 530, once the client device receives the SSID/PSK from the new group owner, the client device performs a Wi-Fi scan to connect to the new group owner. The Wi-Fi scan may be seeking out the SSID of the new group owner.

In block 540, the client device connects to the new group owner. In block 550, the client device transmits its unique identifier to the new group owner, for example, using a group wireless communication method such as Wi-Fi. The client UI may include MAC address, serial number, and IMEI, among others.

In block 560, the new group owner verifies the client device UI (e.g. using Wi-Fi) by determining whether each client device was part of the current group that recently dissolved. The group owner can determine this by checking whether the client device's UI is present in the unique identifier list transmitted during the previous group session (e.g., by verifying that each joining client device MAC address was known before group was dropped).

In block 570, the new group owner drops the connection to the client device if the new group owner does not have a record of the client device being present in a previous group session. If the client device UI matches the unique identifier list, in block 580, the new group owner transmits its UI to the verified client device using a wireless communication method.

In block 590, the client device verifies the new group owner UI by comparing it to the new group owner UI sent previously by the last group owner (e.g. from the current group that dissolved). If the new group owner UIs do not match, in block 595, the client device exits the group.

A benefit associated with the present disclosure is that if a client device was part of the current group that dissolved, the client device is allowed to quickly form or join a new group with the new group owner. If the client device was not part of the current group that dissolved, the client device is required to go through an authentication process (e.g. using quick response (QR) code or near field communication (NFC) or manual entry of credentials) before being allowed to join the group with the new group owner.

Figure 6:
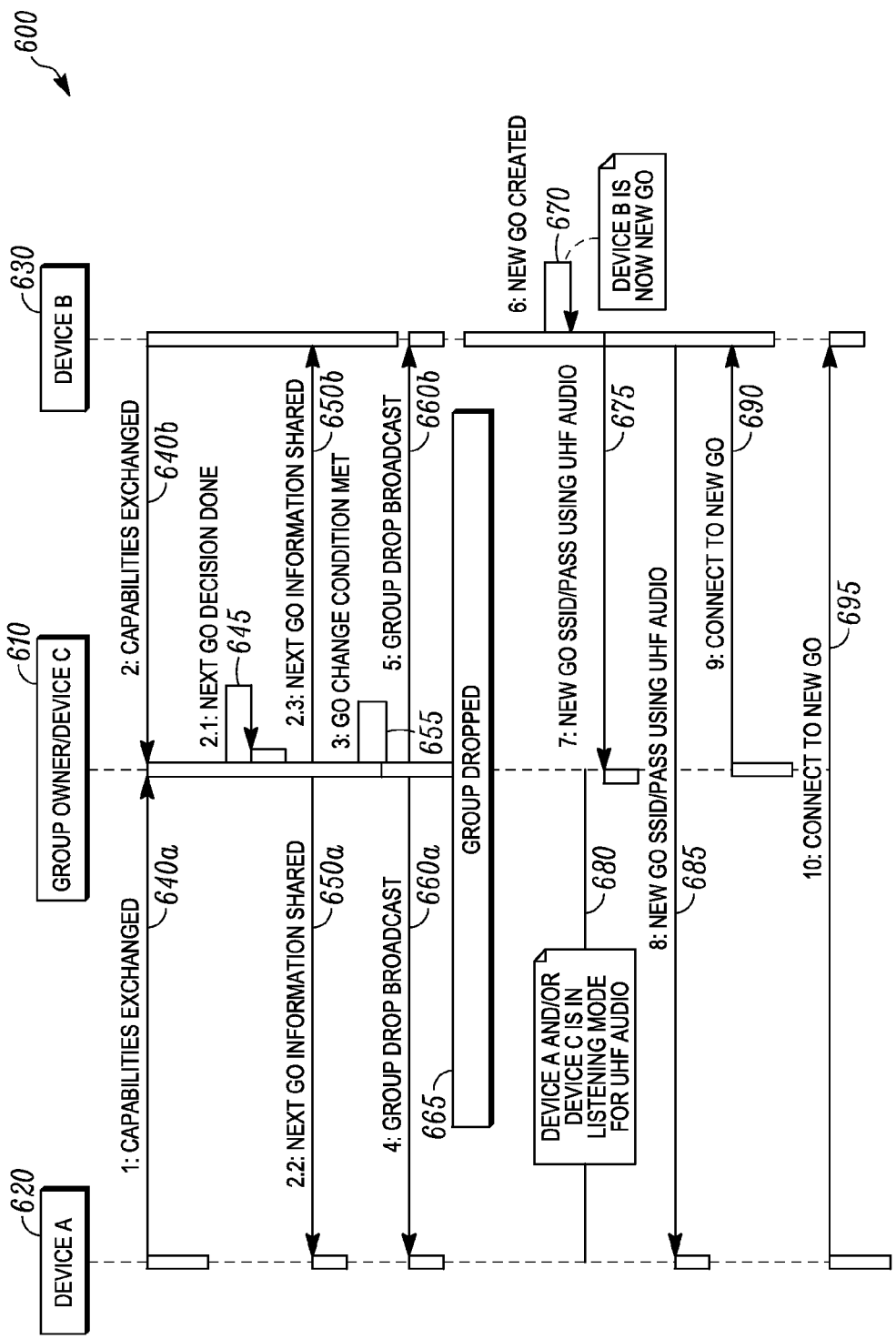
FIG. 6 is a flowchart of a representative overall method for determining a new group owner for forming a new group with the same client devices.

FIG. 6 is a flowchart of a representative overall method 600 for determining a new group owner for forming a new group with the same client devices. As shown in FIG. 6, a group owner (device C) 610 is in communication with client device (device A) 620 and client device (device B) 630.

At step 640a, client device 620 transmits its capabilities to group owner 610 and in step 640b, client device 630 transmits its capabilities to group owner 610. At step 645, group owner 610 determines which client device will be the next group owner for a new group session.

At step 650a, group owner 610 broadcasts the next group owner information (e.g., a unique identifier) to client device 620 and at step 650b, group owner 610 broadcasts the next group owner information (e.g., a unique identifier) to client device 630. At step 655, a group owner change condition is met. Examples of group owner change condition include: (1) group is dropped because group owner has a dead battery, low battery or a hardware failure; (2) new device joins group with better capabilities than group owner; and (3) Wi-Fi signal strength dipping and error rate.

At step 660a, group owner 610 broadcasts the group will be dropped to client device 620 and at step 660b, group owner 610 broadcasts the group will be dropped to client device 630. It should be appreciated that the group dropping broadcast is optional and cannot always be sent. For example, should group owner 610 go out of range, there may not be an opportunity to send such a message.

At step 665, the group is dropped and group owner 610 ceases to be the group owner (hereinafter client device 610). At step 670, the new group owner assumes its role. As shown, client device 630 is the new group owner (hereinafter NGO 630).

At step 675, NGO 630 transmits the new group owner Wi-Fi credentials to client device 610. At step 685, NGO 630 transmits the new group owner Wi-Fi credentials to client device 620. As shown, NGO 630 transmits the Wi-Fi credentials via ultrahigh frequency audio.

At step 680, client device 610 and/or client device 620 enter listening mode. The listening mode mirrors that which client devices 610, 620 expect to hear from NGO 630. As shown, client devices 610, 620 are configured to listen for ultrahigh frequency audio.

At step 690, client device 610 connects to NGO 630. At step 695, client device 620 connects to NGO 630 using, for example, SSID and PSK.

There are many benefits associated with the methods and systems disclosed herein. For example, broadcasting the Wi-Fi credentials aids in providing transparent connections among peer devices and the new group owner. As used herein, transparent connections refer to connections in which not user input/interaction is required. Consequently, new peer devices cannot join the group during this transition phase even if it receives the Wi-Fi credentials via high frequency audio. This allows a group to be formed transparently with existing peers (e.g., ones that belong to a first group) and then let new peers to go through a standard group joining process (e.g., per Wi-Fi Direct standard).

Additional benefits include that device information is propagated by the existing group owner to peers. Thus, the next group owner is always determined and known to all peers upfront. So, if the existing group owner suddenly leaves or goes out of coverage, the rest of the peers know their roles; there is no need to negotiate or poll who will be the next group owner when a "group change" condition is met, avoiding unnecessary delay.

In a first aspect, a method of delegating group ownership from a first device (e.g., a current group owner device 110) to a second device (e.g., a new group owner selected from client devices 120, 130, 140) for the formation of a new group is disclosed. The method includes: determining the second device will be the group owner of the new group during a current group session; broadcasting to devices in the current group session (e.g., devices 110, 120, 130, 140) that the second device will be the group owner of the new group; dissolving the current group session; and forming a new group with the second device as group owner. In an embodiment of the first aspect, the first device is the group owner of the current group and is configured to collect information for all devices in the current group. In an embodiment of the first aspect, collected information includes at least one of SSID/PSK, MAC address, battery capacity, battery discharge level, CPU/RAM capacity, and Wi-Fi capabilities. In an embodiment of the first aspect, determining the group owner of the new group includes determining the device with the lowest MAC address. In an embodiment of the first aspect, determining the group owner of the new group includes determining the device with the highest MAC address. In an embodiment of the first aspect, determining the group owner of the new group includes determining the device with the lowest battery discharge level. In an embodiment of the first aspect, the first device is the group owner of the current group and dissolving the current group includes the first device exiting the current group. In an embodiment of the first aspect, the first device exits the current group due to a condition selected from the group consisting of: low battery, dead battery, hardware failure, a device with better capabilities is detected, the first device desires to exit, Wi-Fi signal strength dipping below a threshold, or error rate. In an embodiment of the first aspect, determining the group owner of the new group is performed whenever a device joins or exits the current group. In an embodiment of the first aspect, broadcasting includes transmitting to devices in the current group, a unique identifier for the second device. In an embodiment of the first aspect, upon dissolving the current group, the second device transmits Wi-Fi credentials to other devices from the current group. In an embodiment of the first aspect, the Wi-Fi credentials are transmitted using high frequency audio (e.g., using speaker 240). In an embodiment of the first aspect, devices from the current group are configured to turn to listening mode for high frequency audio (e.g., using microphone 239). In an embodiment of the first aspect, devices from the current group are configured to compare the unique identifier transmitted from the second device with a unique identifier broadcast from the first device.

In a second aspect, a peer-to-peer network (e.g. network 100) is disclosed. The peer-to-peer network includes: a plurality of client devices (e.g., devices 120, 130, 140); and a group owner device (e.g., device 110) configured to identify and broadcast a new group owner for a new group session from among the plurality of client devices before exiting the peer-to-peer network. In an embodiment of the second aspect, the group owner device includes a group owner module (e.g., group owner module 250) that is configured to determine the new group owner using one or more metrics. In an embodiment of the second aspect, the group owner device is configured to broadcast identifying information for all devices in the peer-to-peer network to each device in the peer-to-peer network. In an embodiment of the second aspect, a new peer-to-peer network is formed from the new group owner and client devices upon the new group owner verifying the client devices using the broadcast identifying information. In an embodiment of the second aspect, the new group owner is configured to transmit its Wi-Fi credentials to client devices in its proximity upon the peer-to-peer network dissolving. In an embodiment of the second aspect, the client devices are selected from the group consisting of: smartphone, wireless phone, desktop personal user device, laptop user device, tablet user device, mobile station, entertainment appliance, netbook, camera, television, game console, and wearable device.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   transmitting, by a first device and to each of a plurality of devices included in a current group, unique identifiers for the plurality of devices, wherein the unique identifiers include a respective unique identifier for each of the plurality of devices included in the current group, and wherein the first device is a group owner of the current group;
   collecting, by the first device, information from the plurality of devices included in the current group;
   determining, by the first device, and based on the information collected from the plurality of devices included in the current group, that a second device from the plurality of devices will be a group owner of a new group, wherein the second device is different from the first device; and
   before the current group is dissolved, transmitting, by the first device and to each of the plurality of devices included in the current group, the respective unique identifier for the second device to identify the second device as the group owner of the new group.

2. The method of claim 1, wherein the collected information includes at least one of a media access control address, a battery capacity, a battery discharge level, a processing capacity, a memory capacity, or wireless capabilities associated with each of the plurality of devices included in the current group.

3. The method of claim 2, wherein determining that the second device will be the group owner of the new group comprises determining that the second device has a lowest media access control address of the plurality of devices included in the current group.

4. The method of claim 2, wherein determining that the second device will be the group owner of the new group comprises determining that the second device has a highest media access control address of the plurality of devices included in the current group.

5. The method of claim 2, wherein determining that the second device will be the group owner of the new group comprises determining that the second device has a lowest battery discharge level of the plurality of devices included in the current group.

6. The method of claim 1, wherein the first device is not included in the new group.

7. The method of claim 6, wherein the first device exits the current group due to one or more of: a low battery of the first device, a dead battery of the first device, a hardware failure of the first device, the second device having better capabilities than the first device, the first device desires selecting to exit the current group, a wireless signal strength dipping below a threshold, or an error rate of the first device.

8. The method of claim 1, wherein collecting the information from the plurality of devices included in the current group is performed when a device joins or exits the current group.

9. A first device, comprising:
   at least one processor; and
   a computer-readable medium configured to store instructions that, when executed, cause the at least one processor to:
      transmit, to each of a plurality of devices included in a current group, unique identifiers for the plurality of devices, wherein the unique identifiers include a respective unique identifier for each of the plurality of devices included in the current group, and wherein the first device is a group owner of the current group;
      collect information from the plurality of devices included in the current group;
      determine, based on the information collected from the plurality of devices included in the current group, that a second device from the plurality of devices will be a group owner of a new group, wherein the second device is different from the first device; and
      before the current group is dissolved, transmit, to each of the plurality of devices included in the current group, the respective unique identifier for the second device to identify the second device as the group owner of the new group.

10. The first device of claim 9, wherein the collected information includes at least one of a media access control address, a battery capacity, a battery discharge level, a processing capacity, a memory capacity, or wireless capabilities associated with each of the plurality of devices included in the current group.

11. The first device of claim 10, wherein the instructions stored by the computer-readable medium cause the at least one processor to determine that the second device will be the group owner of the new group at least by determining that the second device has a lowest media access control address of the plurality of devices included in the current group.

12. The first device of claim 10, wherein the instructions stored by the computer-readable medium cause the at least one processor to determine that the second device will be the group owner of the new group at least by determining that the second device has a highest media access control address of the plurality of devices included in the current group.

13. The first device of claim 10, wherein the instructions stored by the computer-readable medium cause the at least one processor to determine that the second device will be the group owner of the new group at least by determining that the second device has a lowest battery discharge level of the plurality of devices included in the current group.

14. The first device of claim 9, wherein the first device is not included in the new group.

15. The first device of claim 14, wherein the instructions stored by the computer-readable medium further cause the at least one processor to exit the current group due to one or more of: a low battery of the first device, a dead battery of the first device, a hardware failure of the first device, the second device having better capabilities than the first device, the first device selecting to exit the current group, a wireless signal strength dipping below a threshold, or an error rate of the first device.

16. The first device of claim 9, wherein the instructions stored by the computer-readable medium cause the at least one processor to collect the information from the plurality of devices included in the current group when a device joins or exits the current group.

\* \* \* \* \*

UNITED STATES PATENT AND TRADEMARK OFFICE
CERTIFICATE OF CORRECTION

PATENT NO.        : 9,654,552 B2
APPLICATION NO.   : 14/465172
DATED             : May 16, 2017
INVENTOR(S)       : Sreenivasulu Rayanki, Naveen Aerrabotu and Shyam Narayan It is certified that error appears in the above-identified patent and that said Letters Patent is hereby corrected as shown below:

In the Claims

Column 10, Line 10 (Claim 7): Replace "the first device desires selecting" to --the first device selecting--

Signed and Sealed this
Second Day of January, 2018

Joseph Matal
*Performing the Functions and Duties of the*
*Under Secretary of Commerce for Intellectual Property and*
*Director of the United States Patent and Trademark Office*